United States Patent [19]

Pozas Alvarez et al.

[11] Patent Number: 5,796,817
[45] Date of Patent: Aug. 18, 1998

[54] HYBRID CIRCUIT FOR AN ELECTRIC OPERATING AND SCANNING INTERFACE, APPLICABLE TO ELECTRONIC RECORDERS OF ELECTROMECHANICAL TELEPHONE STATIONS

[75] Inventors: Jose Antonio Pozas Alvarez; Luis Perez Roldan, both of Madrid, Spain

[73] Assignee: Telefonica de España, S.A., Madrid, Spain

[21] Appl. No.: 343,916

[22] Filed: Nov. 17, 1994

[30] Foreign Application Priority Data

Dec. 9, 1993 [ES] Spain ............... 9302558

[51] Int. Cl.$^6$ ............................................. H04M 1/00
[52] U.S. Cl. ............. 379/384; 379/377; 379/382; 379/413
[58] Field of Search ................. 379/402, 405, 379/411, 412, 112, 124, 229, 22, 377, 382, 3, 10, 29, 341, 342, 344, 384, 34, 24, 27

[56] References Cited

U.S. PATENT DOCUMENTS

| | | | |
|---|---|---|---|
| 3,718,907 | 2/1973 | Altenberger | 379/229 |
| 3,894,191 | 7/1975 | Sassa | 379/229 |
| 4,002,849 | 1/1977 | Kotler et al. | 379/384 |
| 4,041,465 | 8/1977 | Conerly | 379/384 |
| 4,247,740 | 1/1981 | Anderson et al. | 379/229 |
| 4,365,119 | 12/1982 | Chung et al. | 379/410 |
| 4,539,437 | 9/1985 | Giacopelli et al. | 379/384 |
| 5,333,194 | 7/1994 | Caesar | 379/402 |
| 5,473,666 | 12/1995 | Szczebak, Jr. et al. | 379/402 |
| 5,577,114 | 11/1996 | Morita et al. | 379/384 |
| 5,636,262 | 6/1997 | Melian | 379/384 |

*Primary Examiner*—Krista Zele
*Assistant Examiner*—Jacques M. Saint-Surin
*Attorney, Agent, or Firm*—Reid & Priest LLP

[57] ABSTRACT

A hybrid circuit for an electric operating and scanning interface is especially applicable to electronic recorders of electromechanical telephone stations. The hybrid circuit controls voltage and current parameters on different elements of the station in different situations. The hybrid circuit scans the condition of telephone station elements controlled by it, and programmably applies and receives current and voltage to and from the telephone station elements on which it acts.

9 Claims, 1 Drawing Sheet

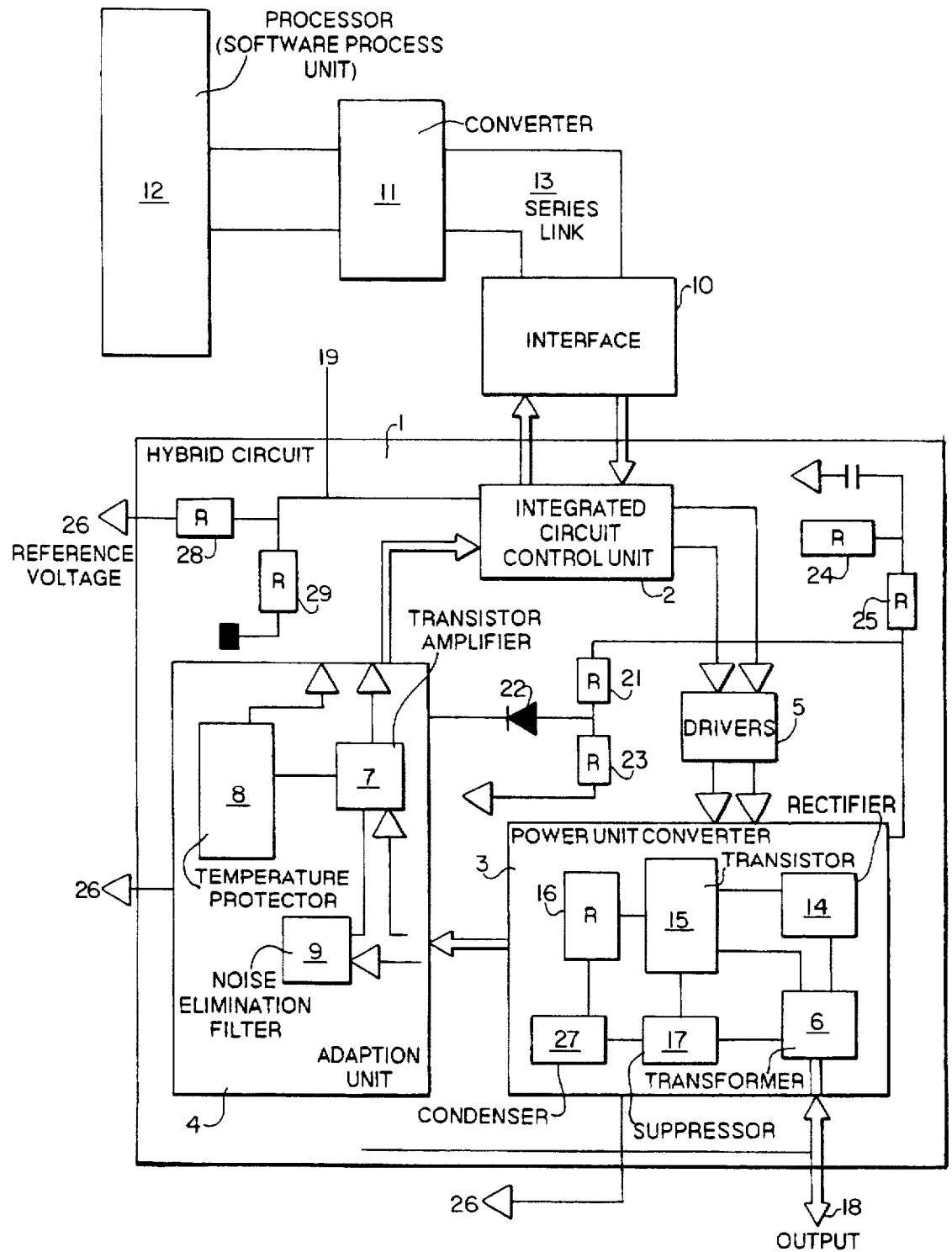

HYBRID CIRCUIT FOR AN ELECTRIC OPERATING AND SCANNING INTERFACE, APPLICABLE TO ELECTRONIC RECORDERS OF ELECTROMECHANICAL TELEPHONE STATIONS

The present specification refers to a patent of invention related to a hybrid circuit for electric operating and scanning interfaces, applicable to electronic recorders of electromechanical telephone stations, configuring a union interface between an electronic system carrying out the modernization of a station and the own station, controlling tension and current parameters on—different elements and situations of the station by means of an energetic transmission to same.

FIELD OF THE INVENTION

This invention applies to the telecommunications field.

RELATED ART

The elements carrying out, at present, marking tasks in electromechanic stations include a complex variety of circuital situations or conditions on the interface with subscriber lines making practically impossible, in these systems, to perform modifications redounding to a better management of resources or to a satisfactory service quality.

Furthermore, these systems include a series of sizeable elements, being necessary to carry out bothersome tasks for their operation and maintenance.

Likewise, these systems are not approachable by subscribers having a multifrequency signaling, or through other type of digital systems.

Solutions posed with semiconductor switches encounter problems in regard to the difficulty about their protection in front of—overloads and overvoltages, requiring at the same time a sustantially great space and, in turn, their efficiency is very limited owing to the fact that, generally, they must be oversized in order to act within the foreseen limits, all this with the resulting expenditure, both in consumption and physical space, having been checked the existence of a large amount of power to be dissipated in order to be capable of working in adequate ranges of temperature.

In front of all these problems, it has been considered as a solution to fit the electromechanical systems in the interface with digital systems, with structures that, being composed of a universal circuit, easily programmable for all the circuital features in which it is to intervene, obtain a sustantial reduction of size and number of elements to be installed and working under adequate conditions as for the energetic consumption and power to dissipate, and relying, in turn, on the appropiate guarantees with regard to the protections for said circuit.

Nevetheless, up to now, nothing is known by the applicant about the existence of an invention considering the characteristics pointed out as suitable.

SUMMARY OF THE INVENTION

The hybrid circuit for an electric operating and scanning interface, applicable to electronic recorders of electromechanical telephone systems as proposed by the invention, constitutes, per se, an obvious solution to the present problems in this respect, since it is configured as a union interface between the—electronic system carrying out the modernization of a modernized electromechanical telephone station and the own station, the circuit being configured as the element controlling tension and current parameters in different elements and situations of the station by means of an energetic transmission to same.

Owing to the fact that the electronic recorder is to be connected to several points in the switching stations and that these points have different configurations, and that, in turn, their requirements vary at the operating time, facts to which it is necessary to add that same must supervise all points in order to perform a later operation in appropiate conditions, the need for making use of a universal circuit for these tasks fitted with the capability of being programmable is evident.

The circuit is, also, capable of scanning the situation or position in which the elements regulated by it stand, it being configured as an inlet or outlet circuit for those cases requiring to inject or take out current or tension from the elements on which it acts, relying, at the same time, on the fact that both tension and current levels are programmable.

On the other hand, the hybrid circuit for an electric operating and scanning interface presents adequate protections in front of overloads overvoltages, short-circuits, transitory peaks introduced by the elements operated by it, and has an additional protection against temperatures.

The feed offert by the circuit to its corresponding loads is independent of the reference feed supplied with which an optimum response reliability is obtained.

Obviously, the solution of the hybrid circuit furnishes, because its design, in a practical way, an outside radiation insulation from other elements of the station, and owing to the minor dimensions of the hybrid circuit, although installing a high number of them on the plates configuring the recorder, the global volume is lesser in relation to the solutions adopted by the present technology.

In a more specific manner, the hybrid circuit for an electric operating and scanning interface, applicable to electronic recorders of electromechanical telephone stations is constituted by three functional units, namely:

A control unit

A power unit

An adaptation unit.

These three units are interconnected on the board, so that, on one of the faces the power unit is installed, while the remaining circuit is installed on the other face, the circuits being installed on the corresponding module so that the power faces of each pair of installed circuits are put face to face, these circuits being connected, on the one hand, to series communication lines, and, on the other hand, to the output load on which it is desired to act.

The control unit is contained in an integrated circuit, specifically developed for performing its functions.

The control unit communicates with the software process unit, where the electric operating and scanning interface is located, by means of two series communication lines. Via one line, the commands from the software process unit are received, and via the other line, the corresponding responses are sent.

The physical interface between the software process unit and this unit is established by means of two blocks, one of them adjusting analog signals to the digital logic (converter block or IDCP), and the other block performing a physical interface between the hybrid circuit and the above-mentioned blocks (interface board or PIPAE).

The converter block includes an adaptation between the parellel bus of the software process unit and the series links of this unit.

The interface board provides the necessary galvanic separation between both parts.

For all it, the functions of the control unit in relation to this interface are:

It receives commands from the software process unit of the module for the desired programming of on the point to be controlled.

It sends responses to the software process unit of the module, according to the commands received.

In relation to the output points, to which it can accede, it performs the following functions:

It sends control signals to the power unit, controlling its operation.

It receives and processes information from the adaptation—unit, this later indicating the status of the output of the power unit, as well as the internal operating status of the own power unit.

The power unit is basically composed of a bidirectional DC/DC converter, so being capable of sending or receiving a current in the output, these output levels being programmable in every case.

The task of this unit is to activate the precise point to be acceded. Due to the fact that different points can have very different configurations, this unit is also siseable in different ways.

The power unit can be programmed as an operating (output) circuit, or a scanning (input) circuit.

When it operates as an output, the input side continues to operate, and it gives an indication of the signal level it is generating.

It accepts a configuration as current generator or as voltage generator, according to the requirement of the point it attends to. The output voltage can be, by means of a programming relative to a negative voltage of battery or relative to mass or earth.

Likewise, it presents several operating modes which are programmable and respond to the load requirements, both with regard to their diversity and their temporary evolution.

The output values are programmable, with an adquate exactness, with which all possible load configurations are covered.

In this way, the status of the points to be acceded can be scanned, and also to act on them, by generating both the voltage and current desired in each particular case.

The operating frequency of the converter is fixed, although in some situations, depending on the load connected to the electric operating and scanning interface or point, this frequency can be lower, or presents a continuous operation.

The converter control is made by means of a pulse width modulation, originating in the control unit.

Said pulses are delivered to drivers, which furnish the necessary current, operating the converter transistors.

In the manner previously described, it is possible to control the energy transferred between windings of the converter transformer, as well as the energy transfer sense (primary-secondary or vice versa).

The adaptation unit is constituted by circuits basically formed by level adapters and filters.

The adaptation unit performs a power level adaptation function at logic levels of the different parameters to be supervised by the control unit, both of electrical operating and scanning interface outlet and the internal operation of the power unit.

Filters located on this block contribute to clear the signals delivered to the control unit, without possible noise interferences due to the own operation of the power unit or due to external interferences.

The signals delivered to the control unit by the adaptation unit refer to the voltage level at the electric operating interface, level and sense of the current at said interface, instantaneous levels of current on the primary and secondary windings of converter, and a fixed reference level programmed by the control unit.

Other signals sent by the adaptation unit refer to the feeding voltage level of the station battery, and in this unit a temperature sensor is located or incorporated that, when activated, inhibits the operation of the power unit.

BRIEF DESCRIPTION OF THE DRAWINGS

In order to complement this description and to aid to a better understanding of the features of the invention, the accompanying drawing, which is a part of this specification, shows, in an illustrative but non limitative sense, the following:

The unique figure shows a block diagram of the hybrid circuit for an electric operating and scanning interface, applicable to electronic recorders of electromechanical telephone stations (1), which is composed of a control unit (2), a power unit (3) and an adaptation unit (4).

The control unit (2) operates and supervises the operation of the power unit (3) by a pulse width modulation. These control signals pass through driver circuits (5), which deliver said signals with the necessary current.

The power unit (3) includes a dual dial DC/DC converter (6),—which allows the current at the output (18) to be delivered or sent.

The control unit (2) supervises the output circuit by means of adaptation circuits (7) and (9), which deliver the signals with the adequate levels, and eliminate noises which could be caused by the converter operation or owing to external interferences.

Furthermore, a temperature protecting circuit is provided (8), which, when acting, will inhibit the operation of the hybrid circuit for an electric operating and scanning interface.

All these circuits are fed by a reference voltage −Vbat (26).

The control unit (2) communicates with the software process unit (UPSW) (12) via two series communication lines, a line which sends commands on the part of the software process unit, and a line which sends the relative responses.

The physical interface between the software process unit (12) and the control unit (2), is made by means of two blocks, which are constituted by a converter block (11) and an interface board (10).

The converter block (11) carries out the adaptation between a parallel bus of the software process unit (12) and the series links (13) it has with the control unit (2).

The interface board (10) performs a galvanic separation between the software process unit (12) and the control unit (2).

The control unit (2) is constituted by an integrated circuit. Each integrated circuit which constitutes the control unit (2) has an own identification address assigned, so that it will only accept commands the addressing field of which will coincide with that assigned to it.

The responses of these integrated circuits have also a field containing the own address, with which each of them can be identified.

The control unit (2), constituted by an integrated circuit, controls the following signals, namely:

System clock input.

Circuit initialization. This input signal is coded, and allows the integrated circuit to be initialized, as well as its synchronization with the converter block (11) for sending and receiving information.

Own identification address input.

Information output in order that the following circuit will obtain its identification address.

Series link through which the converter block (11) sends commands to this unit, originating in the software process unit (12) of the module.

Series link through which the unit sends responses to the converter block (11).

Analog input of the feeding voltage level of the station.

Analog input of information about the voltage level at the output (18).

Digital output of pulses for controlling the operation of the converter (3), in the case of outgoing power for the output (18). These pulses activate the transistor (15) corresponding to the secondary of transformer (6), and are active at low level.

Analog input of the instantaneous current value at the primary of transformer (5).

Analog input of the current comparative value.

The power unit (3) is composed, basically, of a DC/DC dual dial converter, formed by the transformer (6) and the transistor (15), so being capable of sending or receiving current at the output. The output levels are programmable.

Owing to the different electric operating interfaces of this—circuit which can have very different configurations, the power unit (3) is sizeable in different forms or modes, namely:

- It can be programmed as an operating (output) circuit or a scanning (input) circuit. When operating as output, the input side continues to operate and gives an indication of the signal level it is generating.
- It can be configured as a voltage or current generator.
- It is capable of operating under different operating modes, all them being programmable and adapted to occurrences at the output load (18).
- The output voltage can be, by a programming, relative to a negative voltage of the battery, or relative to earth.
- The output (18) is programmable, all possibilities of load configuration being covered.

In this manner, the status of the points to be acceded at the output (18) can be scanned, and act on them, by generating the desired voltage and current in every case, carrying out only the hybrid circuit programming, this hybrid circuit being common for all electric operating and scanning interfaces, in accordance with the required features.

The converter (3) is fed with the battery voltage of the station (26), and from this later, information about different parameters for controlling its operation is obtained.

The output voltage of the converter (3) is zero or positive with regard to this reference voltage.

The frequency of the converter operation is, generally, fixed, although with certain operating conditional factors, the frequency can be established lower or a continuous operation can be set up.

The control of the converter (3) is effected by means of a pulse width modulation originating in the integrated circuit (2). These pulses are delivered to drivers (5), which furnish the necessary current, by regulating the transistors (15) of the converter (3).

The converter (3) is a circuit based on the flyback topology. In the case of transferring energy to the output (18), when the transistor (15) enters into the conducting stage, the current increases in the transformer (6) primary, storing energy in it, this energy being transferred to the other winding during the disconnection time.

The device controlling the pulse width, carried out by the integrated circuit (2), energizing the transistor (15), allows the energy transfer to be varied.

The inductance value of the primary winding of transformer (6) is calculated so that it stores power enough and transfers its whole directly to the secondary for the disconnection time.

This value is high in comparison with other type of converters, which makes the efficient value of the current in the primary to be lesser, so reducing the conduction losses, both in this winding and the transistor (15) and sensing resistance of the current (16), with which the circuit efficiency increases.

During the time the secondary is conducting, the magnetic flow in the primary becomes zero, and the transistor (15) supports a reverse voltage between its terminals D-S.

As the magnetic flow in the transformer (6) nucleous becomes zero before ending each period of the switching signal, the current circulating over the secondary is discontinuous.

A sole energy storing device is used, not being necessary to utilize an inductor for storing it.

During the conduction time, the transformer (6) stores energy in its primary winding; the rectifier (14) remains in reverse. The energy delivered to the load is provided by the output condendenser (27).

Both in the primary winding and the secondary winding there is a limiter (14) of the reverse voltage produced during the transistor (15) disconnection.

By means of a suppressor (17), the circuit is protected against external interferences, limiting these to a value adequate to the circuit.

The different power levels produced both at the output (18) and the converter (3) are adapted by the adaptation unit (4) at logic levels for being supervised on the part of the integrated circuit (2) of the control unit (2).

The adaptation unit (4) is formed by circuits basically including level adaptors and filters. So, the information from different signals is delivered with adequate levels, and without interferences due to the own operation of the converter (3) or external interferences.

The information delivered by these circuits to the control unit refers to the following signals:

Voltage level at the output (18), delivered by means of a divider composed of resistances (24) and (25).

Current level and sense at the output (18). The information delivered from this current corresponds to a mean value. The current is sensed in the resistance (16), and amplified by means of a transistor amplifier (7). Due to the fact that the sensed current is pulsatory and has a triangular shape, it is filtered at the filter block (9), so obtaining the mean value. By means of a transistor (7) and related components, a reference of continuous voltage and temperature compensated is obtained.

Current level at the primary winding of transformer (6), detecting the operation in case of current delivery in the out-out (18) (outgoing current). The information delivered corresponds to the instantaneous value.

The current in primary is sensed on the resistance (16) and amplified by means of a transistor of block (7). Through the transistor (7) and related components, a reference of continuous and temperature compensated voltage is obtained.

Current level in the secondary winding of transformer (6), detecting the load status in the output (18) and the internal—operation of converter (3) in case of accepting current from the output (18). The information delivered from this current is that corresponding to the instantaneous level. The secondary current is sensed in the resistance (16) and amplified by means of a transistor of the block (7), obtaining for the latter a reference of continuous and temperatura compensated voltage.

Feeding voltage level of the station battery. This information is delivered through the divider formed by resistances (28) and (29).

By means of a cell formed by resistances (21) and (23) and diode (22), the output voltage of converter is limited until a given maximum.

A protection circuit against the temperature (8) is provided, so that if the temperature reaches a determined value, the operation of the circuit is inhibited, leaving the converter (3) in a rest state.

This protecting circuit is performed by means of a resistance the value of which is increased in front of an increase of temperature and components grouped in block (8). When the temperature reaches the determined value, the block (8) carries to a zero level the analog input signal of reference of the integrated circuit (2), thanks to which the integrated circuit will detect that the peak current is higher than that admitted, then inhibiting the pulse signal for the converter operation (3).

It is not considered necessary to extend more this description—for an expert in the art to understand the scope of the invention and the advantages derived from it.

The materials, shape, size and arrangement of the components are open to variation, provided that it does not imply any alteration to the essence of the invention.

The terms under which this specification has been described—should be always taken in an ample and non limitative sense.

We claim:

1. A hybrid circuit for an electric operating and scanning interface especially suitable for use with electronic recorders of electromechanical telephone stations that include elements that have conditions that can be scanned, the hybrid circuit comprising:

a) a programmable control unit contained an integrated circuit, the programmable control unit including:
   1) means for receiving commands from an external processing unit by which the programmable control unit is programmed; and
   2) means for providing pulse-width modulation signals in response to the commands received from the external processing unit;

b) an adaptation unit, controlled by the control unit, the adaptation unit and the control unit collectively constituting means for scanning the condition of the elements in a telephone station; and c) a power unit, controlled by the pulse-width modulation signals from the programmable control unit and in response to load requirements at an output of the power unit, to operate in first and second modes, including:
   1) a first mode for acting on the elements of the telephone station by outputting programmable-level currents and programmable-level voltages that are programmable in accordance with the pulse-width modulation signals from the programmable control unit; and
   2) a second mode for sensing electrical characteristics of the telephone station elements at the output to communicate to the control unit.

2. The hybrid circuit of claim 1, wherein the an integrated circuit controls operations digitally, the operations including:

cyclically checking load current and voltage at the output of the hybrid circuit; and
   instantaneously sensing current in windings of a transformer in the power unit.

3. The hybrid circuit of claim 1, wherein:
   the control unit constitutes a digitally programmable integrated circuit; and
   the control unit includes means for exchanging commands and responses with a processor module of a board to which the hybrid circuit is connected.

4. The hybrid circuit of claim 1, wherein:
   the control unit is a programmed integrated circuit which consumes a small amount of power, so as to minimize power consumption and heat dissipation in the hybrid circuit.

5. The hybrid circuit of claim 1, wherein:
   the power unit has an output which has a voltage and current which the power unit controls based on output load requirements.

6. The hybrid circuit of claim 1, wherein:
   the power unit includes a suppressor for protecting against overvoltages and overcurrents caused by operation of telephone station elements.

7. The hybrid circuit of claim 1, wherein:
   the adaptation unit includes means for sending a signal to the control unit for inhibiting operation of the hybrid circuit to protect the hybrid circuit from operating in the presence of excess temperatures.

8. The hybrid circuit of claim 1, wherein the hybrid circuit includes:
   a first face on which the power unit is situated; and
   a second face on which the control unit and adaptation unit are situated.

9. The hybrid circuit of claim 1, further comprising:
   means for accepting a wide range of voltage level variation from the telephone station so that the hybrid circuit's units operate independently of possible fluctuations in the voltage level from the telephone station.

* * * * *